United States Patent
Terashima

(10) Patent No.: US 11,842,106 B2
(45) Date of Patent: Dec. 12, 2023

(54) SYSTEM, PRINTING SYSTEM, AND CONTROL METHOD FOR TRANSMITTING A PRINT JOB BETWEEN PRINTING SYSTEMS

(71) Applicant: CANON KABUSHIKI KAISHA, Tokyo (JP)

(72) Inventor: Yuto Terashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/707,758

(22) Filed: Mar. 29, 2022

(65) Prior Publication Data
US 2022/0317953 A1 Oct. 6, 2022

(30) Foreign Application Priority Data

Apr. 1, 2021 (JP) .................. 2021-062990
Oct. 6, 2021 (JP) .................. 2021-164774

(51) Int. Cl.
*G06F 3/12* (2006.01)

(52) U.S. Cl.
CPC .......... *G06F 3/1239* (2013.01); *G06F 3/1222* (2013.01); *G06F 3/1274* (2013.01); *G06F 3/1287* (2013.01)

(58) Field of Classification Search
None
See application file for complete search history.

(56) References Cited

U.S. PATENT DOCUMENTS

2013/0163027 A1 6/2013 Shustef
2020/0409631 A1* 12/2020 Liang .................. G06F 21/608

FOREIGN PATENT DOCUMENTS

EP 3742279 A1 11/2020
JP 2020187700 A 11/2020

* cited by examiner

*Primary Examiner* — Andrew H Lam
(74) *Attorney, Agent, or Firm* — Canon U.S.A., Inc. IP Division

(57) ABSTRACT

The first printing system communicable with the client terminal and the authorization system requests the authorization system to acquire authorization information to the second printing system, receives authorization information from the authorization system to the second printing system, and stores the received authorization information. When the first printing system receives the print job from the client terminal, the first printing system transmits the print job to the second printing system by using the stored authorization information. A second printing system communicable with the image forming apparatus receives the print job transmitted from the first printing system and transmits the received print job to the image forming apparatus.

8 Claims, 12 Drawing Sheets

SYSTEM, PRINTING SYSTEM, AND CONTROL METHOD FOR TRANSMITTING A PRINT JOB BETWEEN PRINTING SYSTEMS

BACKGROUND

Field of the Disclosure

The present disclosure relates to a system for printing, a printing system, and a control method.

Description of the Related Art

In recent years, a cloud print service (hereinafter referred to as CPS) which inputs a print job via the cloud and transmits the print job to an image forming apparatus has begun to spread. In such a printing system, the administrator first registers the image forming apparatus with the tenant of the CPS to which the administrator belongs. The administrator sets which user is permitted to use the image forming apparatus. Here, a tenant means a service system to be deployed in the cloud for each user. The tenant is allocated a storage area whose access is restricted for the exclusive use of the user.

Japanese Patent Application Laid-Open No. 2020-187700 discloses that the CPS 104 checks with the CPS 105 whether or not there is a print job in the CPS 105 addressed to a cloud printer that the CPS manages. When the corresponding print job exists, the CPS 104 requests the CPS 105 to acquire the print job by using the access token, and the CPS 105 transmits the print job to the CPS 104.

In the technique described in Japanese Patent Application Laid-Open No. 2020-187700, when a print job in a first printing system (equivalent to CPS 105) is acquired from a second printing system (equivalent to CPS 104), periodic polling from the second printing system to the first printing system is required.

SUMMARY

It is therefore an object of embodiments of the present disclosure to securely and smoothly exchange information between different printing systems.

According to embodiments of the present disclosure, a system includes a first printing system and a second printing system, the first printing system being communicable with a client terminal and an authorization system and the second printing system being communicable with an image forming apparatus, wherein the first printing system comprises one or more first memories and one or more first processors that execute a set of first instructions to: perform, to the authorization system, an acquisition request of authorization information to the second printing system; receive, from the authorization system, the authorization information to the second printing system; store the received authorization information in the one or more first memories; receive print job from the client terminal; and transmit, to the second printing system, the received print job from the client terminal by using the stored authorization information, and wherein the second printing system comprises one or more second memories and one or more second processors that execute a set of second instructions to: receive the transmitted print job from the first printing system; and transmit the received print job from the first printing system to the image forming apparatus.

Further features of the present disclosure will become apparent from the following description of exemplary embodiments with reference to the attached drawings.

DESCRIPTION OF THE EMBODIMENTS

Figure 1:
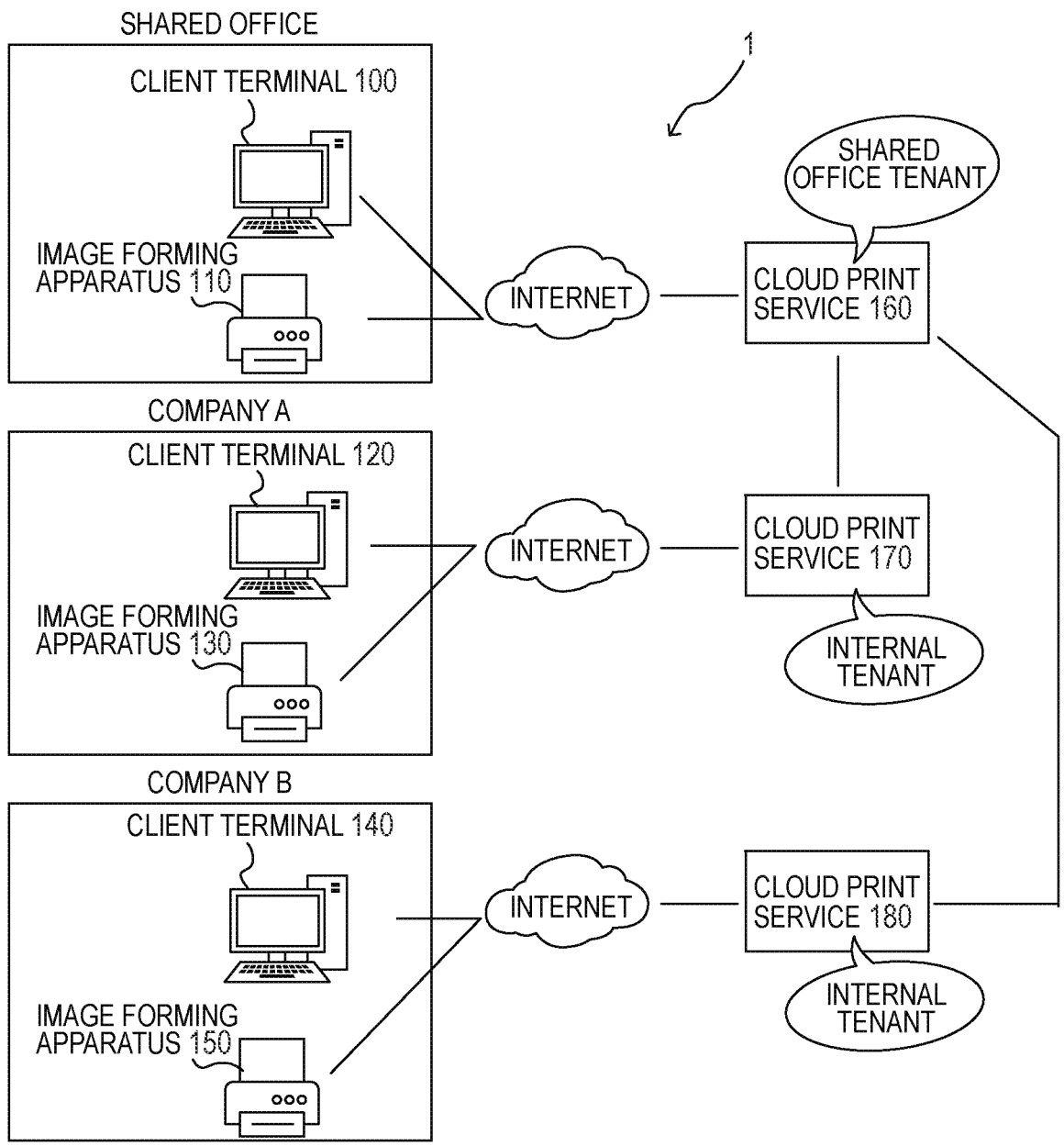
FIG. 1 illustrates an example of the overall configuration of the system.

Embodiment of the present disclosure will now be described with reference to the drawings. It should be noted that the following embodiments are not intended to limit the disclosure, and not all of the combinations of features described in this embodiment are deemed to be essential. The same components will be described with the same reference numerals.

[System Configuration]

FIG. 1 is a diagram illustrating an example of the overall configuration of the system according to the present embodiment. The system 1 according to the present embodiment comprises cloud print services (hereinafter referred to as CPSs) 160, 170, 180, client terminals 100, 120, 140, and image forming apparatuses 110, 130, 150. The image forming apparatuses 110-150 receive the print job via the CPSs 160-180 connected to each of the image forming apparatuses, execute the received print job, and print an image on a sheet of paper. The client terminals 100-140 are PCs (personal computer) operated by a user, and transmit a print job inputted by the user to the CPSs 160-180 connected to each of them.

The client terminal 100 and the image forming, apparatus 110 are installed in a shared office and are communicably connected to the CPS 160 via the internet. The shared office is a shared space that can be used based on a contract with a specific company. The client terminal 120 and the image forming apparatus 130 are installed in a specific company A and are communicably connected to the CPS 170 via the intranet. The client terminal 140 and the image forming apparatus 150 are installed in a specific company B and are communicably connected to the CPS 180 via the internet.

The CPS 160 is managed by an administrator of the shared office, and a tenant assigned to the CPS 160 is defined as a shared office tenant. A user using the shared office is registered in the CPS 160. CPSs 170, 180 are managed by company A and company B, respectively. Tenants assigned to the CPSs 170, 180 are defined as internal tenants. In the CPSs 170,180, employees who work for company A and company B are registered as users, respectively. The CPS 160 is communicably connected to the CPSs 170, 180 by a network. The network includes, for example, a LAN such as the internet, a WAN, a telephone line, a dedicated digital line, and an ATM. Alternatively, the communication network is realized by these combinations.

The CPS 160 transmits the print job received from the client terminal 100 and the print job received from the CPSs 170, 180 to the image forming apparatus 110. The CPS 170 transmits the print job received from the client terminal 120 and the print job received from the CPS 160 to the image forming apparatus 130.

A case where the CPS 170 transmits the print job received from the client terminal 120 to the CPS 160 using the system 1 will be described below. The client terminal 120 is an example of an information processing apparatus. The CPS 170 is an example of the first printing system. The CPS 160 is an example of a second printing system.

In this embodiment, the CPS 160 is described as a shared office tenant, and the CPSs 170, 180 are described as internal tenants, which are described as other CPSs. However, these CPSs may consist of the same configuration, such that CPSs 170, 180 also serve as CPS 160.

In this embodiment, the CPSs 160, 170 are communicatively connected to an authorization system including an authorization server via the internet.

[Hardware Configuration]

Figure 2:
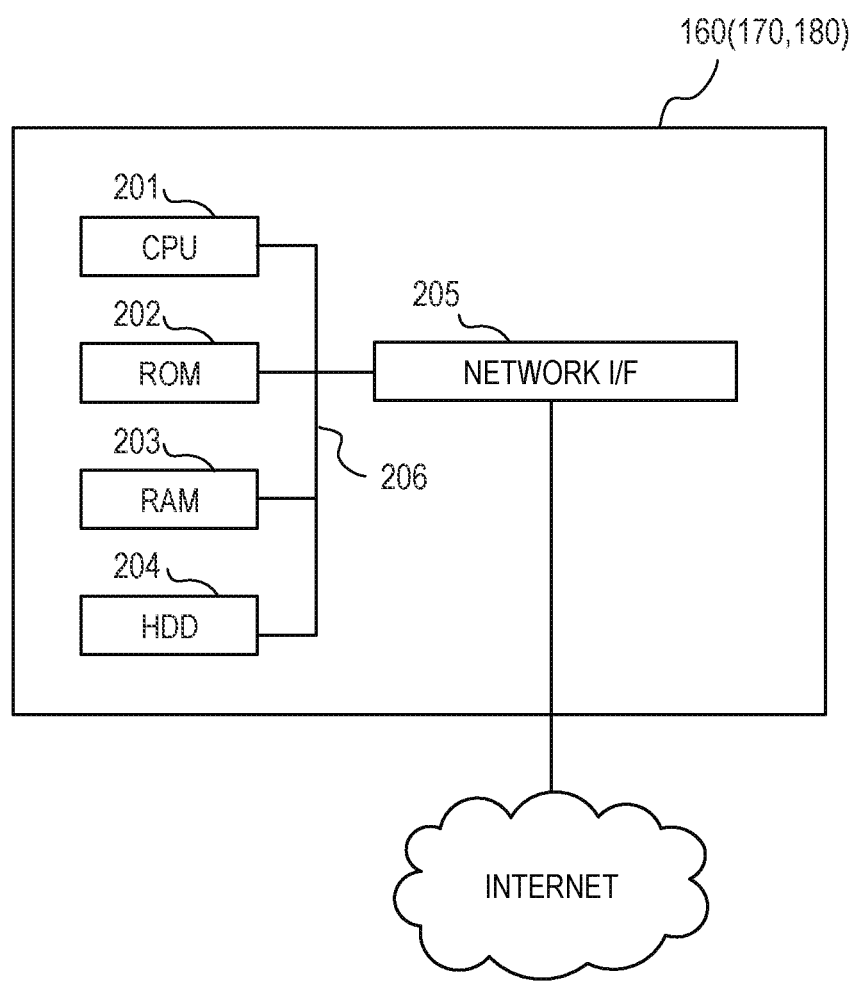
FIG. 2 illustrates an example of a hardware configuration of a cloud print service.

FIG. 2 is a diagram illustrating an example of the hardware configuration of the CPSs 160-180. In this embodiment, a server as an actual resource provides CPSs 160-180 in which resources are allocated to a plurality of different tenants by using containerization or virtualization technology. Since the CPS 160 and the CPSs 170, 180 can be implemented in the same hardware configuration, the CPS 160 is described in FIG. 2, and the description of the CPSs 170, 180 is omitted.

The CPS 160 includes a CPU 201, a ROM 202, a RAM 203, an HDD 204, and a network I/F 205, and these components are connected via a bus 206. The CPU 201 controls the overall operation of the CPS 160 in cooperation with each unit. The CPU 201 executes processing based on a program stored in the ROM 202 or the HDD 204. The RAM 203 is the main memory of the CPU 201 and is used as a work area or a temporary storage area for deploying various programs. The HDD 204 stores print data, image data, various programs, and various other data. In this embodiment, a case where one CPU 201 executes a program stored in the ROM 202 or the like using one memory (the RAM 203) to execute respective processes shown in a sequence diagram and a flowchart to be described later is illustrated, but other embodiments may be adopted. For example, a plurality of storage devices such as CPUs, RAMs, ROMs, and HDDs may be cooperatively operated to execute respective processes described later.

The network I/F 205 is an interface for network communication with the outside. The CPS 160 receives processing requests from the client terminal 100, the image forming apparatus 110, and the CPSs 170, 180 via the network I/F 205, performs various processes, and transmits and receives various data. Similarly, the CPS 170 receives processing requests from the client terminal 120, the image forming apparatus 130, and the CPS 160 via the network 205, performs various processes, and transmits and receives various data.

[Software Configuration]

Figure 3:
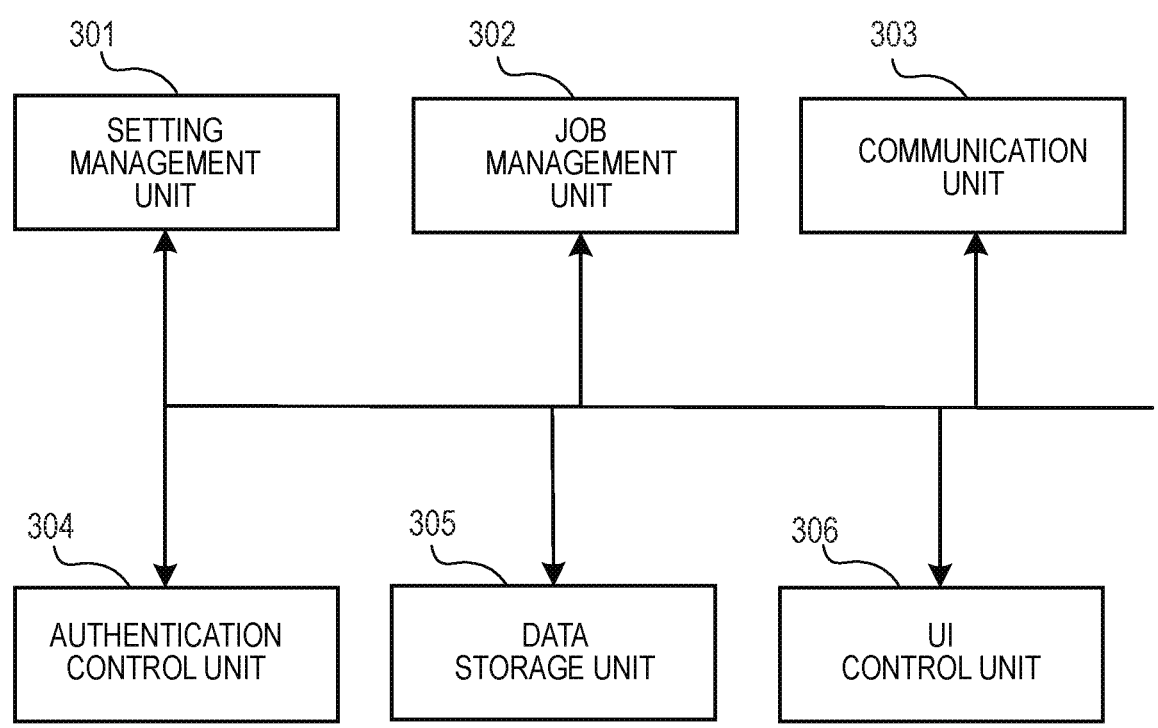
FIG. 3 illustrates an example of a software configuration of a cloud print service.

FIG. 3 is a diagram illustrating a configuration example of a software module operating on the CPSs 160-180. Each software module is stored in the ROM 202 or the like illustrated in FIG. 2, is loaded into the RAM 203 to be executed by the CPU 201. Since the CPS 160 and the CPSs 170, 180 can be implemented in the same software configuration, the CPS 160 is described with reference to FIG. 3, and the description of the CPSs 170, 180 is omitted.

A setting management unit 301 stores settings related to various functions of the CPS 160 in a storage device such as a RAM 203 and an HDD 204, and reads the settings from the storage device. Here, the setting means, for example, information indicating an external CPS that can be linked (for example, a URL) or information of an image forming apparatus registered in the CPS 160. A job management unit 302 stores a print job received from a client terminal 100, a print job received from an external CPS, and print job-related information (for example, identification information of a print job to be described later) in a data storage unit 305.

Figure 7:
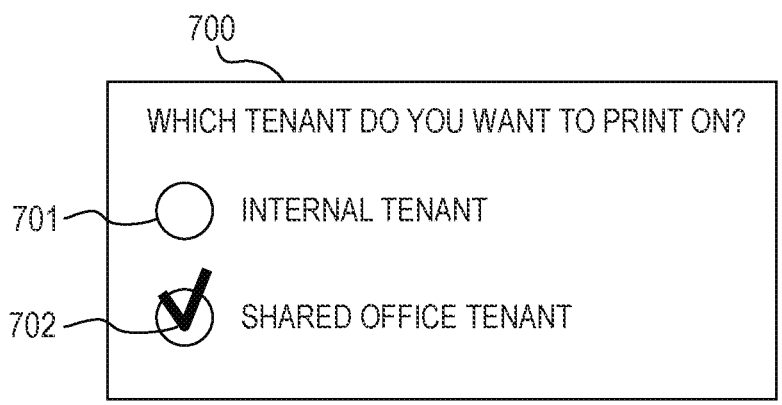
FIG. 7 illustrates an example of a selection screen.

The communication unit 303 communicates with the client terminal 100, the image forming apparatus 110, and the external CPS registered in the CPS 160 via the network I/F 205, and receives each processing request and transmits each processing result. The authentication control unit 304 performs user management, Specifically, the authentication control unit 304 stores the user information of the user added by the manager of the tenant in the data storage unit 305 or the user management dedicated data base (not shown). The authentication control unit 304 may cooperate with other authentication services. The data storage unit 305 stores data in response to a request from the job management unit 302 or the authentication control unit 304. The UI control unit 306 generates and transmits a screen UI (user interface) in response to a request from the client terminal 100 or the image forming apparatus 110. For example, the UI control unit 306 of the CPS 170 generates a screen as shown in FIG. 7 in response to a request from the web browser of the client terminal 120, and transmits the screen to the client terminal 120 by the communication unit 303.

[Authorization Sequence]

Figure 4:
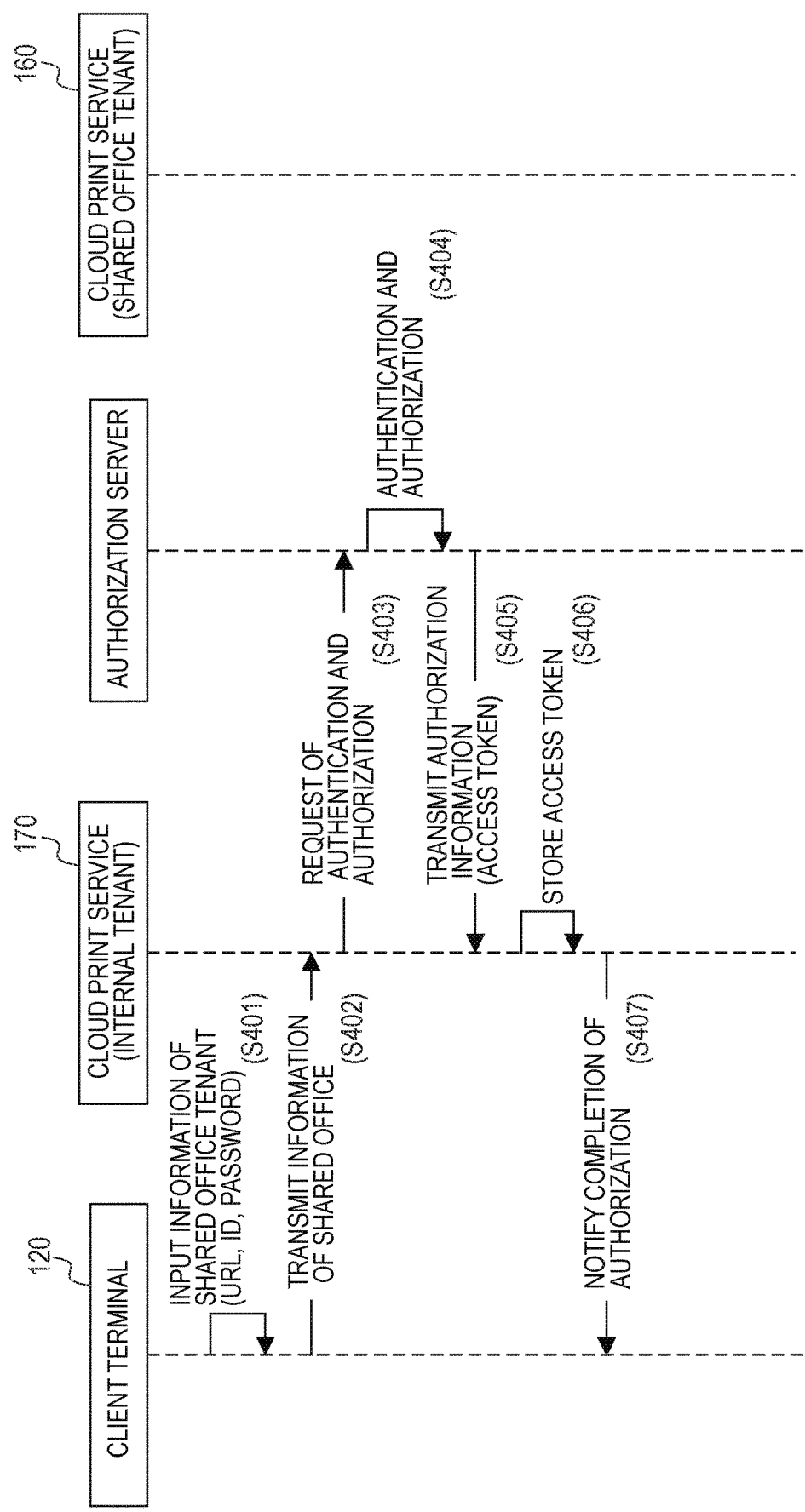
FIG. 4 illustrates a sequence diagram of an approval flow.

FIG. 4 illustrates a sequence diagram for authorizing access from CPS 170 to CPS 160 using an authentication and authorization mechanism such as OAuth. On the assumption that the user has issued the user accounts of the CPS 160 and the CPS 170, respectively. In the following description, each step is indicated by adding an "S" at the beginning, thereby omitting the indication of the step.

First, the client terminal 120 inputs the information of the user account of the CPS 160 (for example, login ID, login password) and the URL of the CPS 160 by the user's operation (S401). In the present embodiment, because it is assumed that the user is in the shared office, the operation here and the operations in S501 and S503 in FIG. 5, which will be described later, are performed via the client terminal 100 during remote connection.

Next, the client terminal 120 transmits an authorization request to the CPS 160 together with the information inputted in S401 to the CPS 170 (S402). The CPS 170 receives the authorization request or the like from the client terminal 120. Here, the CPS 170 assigns a tenant name to the URL of the CPS 160 included in the received information and stores it in the RAM 203 or the like.

Thereafter, the CPS 170 transmits the information received from the client terminal 120 to the authorization server (S403).

Subsequently, the authorization server performs authentication and authorization processing based on the information received from the CPS 170 (S404). If the authentication and authorization processing is successful, the authorization server issues an access token as authorization information and transmits it to the CPS 170 (S 405). Next, the CPS 170 stores the access token received from the authorization server in the RAM 203 or the like in association with the user who made the authorization request (the user logged in to the CPS 170) (S406), and notifies the client terminal 120 that the authorization is completed (S407). Thereafter, a series of processes illustrated in the sequence diagram of FIG. 4 is completed.

According to the authorization sequence of FIG. 4 as described above, by using the authentication and authorization mechanism, it is possible to transmit confidential data such as a print job from the CPS 170 to the CPS 160 in a secure manner. In the authorization sequence of FIG. 4, user authentication is performed by a method in which a user inputs a login ID and a login password, but the method of user authentication is not limited to this method.

[Transmission Flow of the Print Job]

Figure 8:
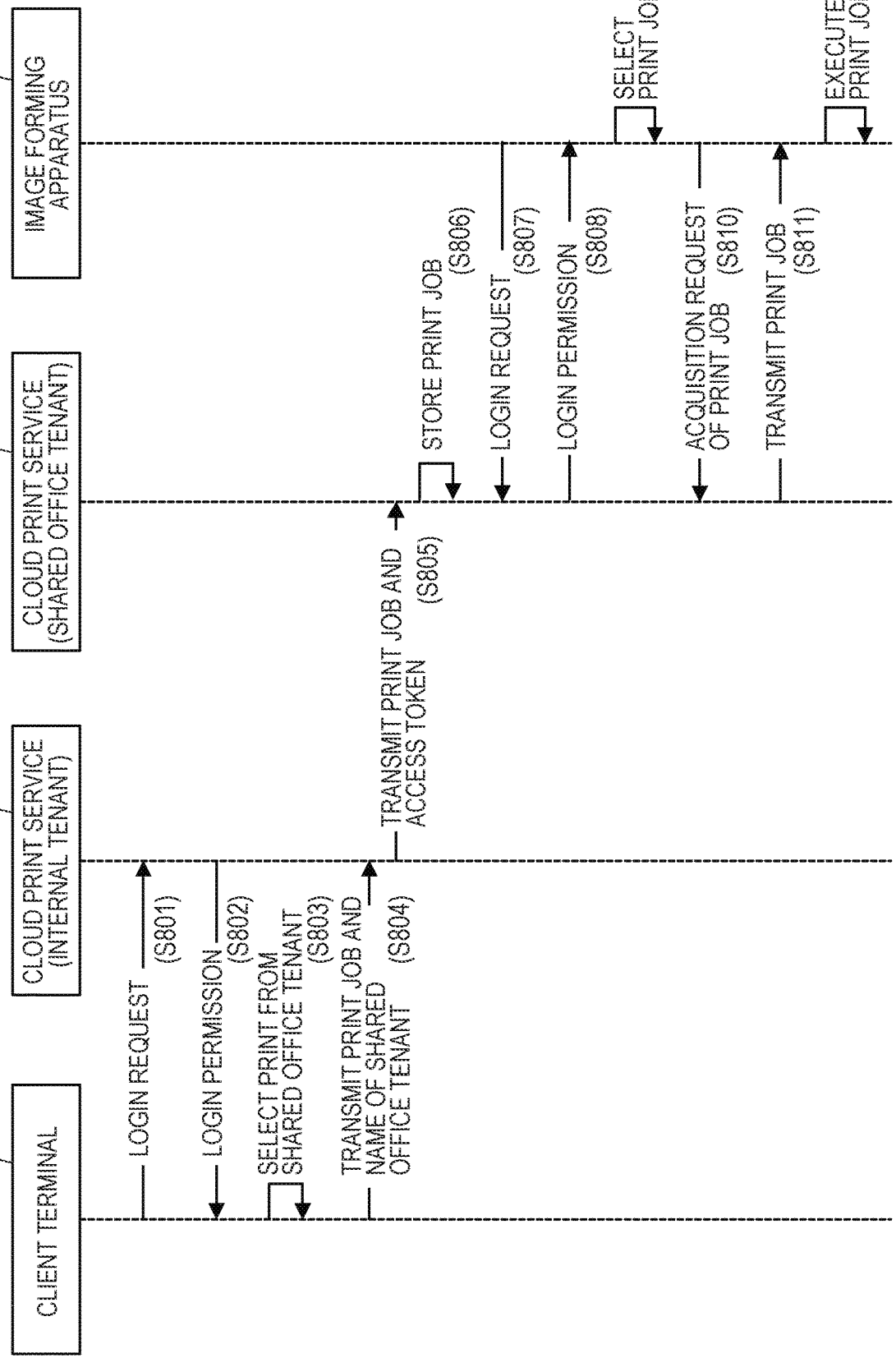
FIG. 8 illustrates a sequence diagram of a transmission flow of a print job.

FIG. 8 is a sequence diagram illustrating the flow of processing until the image forming apparatus 110 executes a print job for printing data such as a document file stored in the client terminal 120.

It is assumed that the authorization from the CPS 170 to the CPS 160 has been completed according to the authorization sequence shown in FIG. 4.

First, the client terminal 120 transmits a login request to the CPS 170 together with information for logging in to the CPS 170 inputted by the operation of the user (S801). Thereafter, the CPS 170 permits the client terminal 120 to log in using the information received from the client terminal 120 (S802). Next, the CPS 170 generates a selection screen for selecting the execution destination of the print job in response to a print request from the client terminal 120, and provides the selection screen to the client terminal 120. The client terminal 120 displays the provided selection screen and selects the tenant to which the print job is executed by user operation (S803).

FIG. 7 is a diagram illustrating an example of a print job execution destination selection screen. This selection screen is displayed on the display of the client terminal 120. The selection screen 700 of FIG. 7 is provided with a check box 701 for selecting an internal tenant and a check box 702 for selecting a shared office tenant. Hereinafter, the description will be made assuming that the check box 702 is checked on the selection screen 700 and the shared office tenant is selected.

When the shared office tenant is selected as the execution destination of the print job, the client terminal 120 transmits the print job to the CPS 170 together with the selected tenant name (S804).

Subsequently, the CPS 170 transmits the print job received from the client terminal 120 to the CPS 160 together with the access token stored in S406 of FIG. 4 (S805). The CPS 160 stores the print job received from the CPS 170 in the HDD 204 or the like (S806). The user in the shared office performs an operation of transmitting a print job by the client terminal 120 of a remote connection destination via the client terminal 100, and moves to the front of an image forming apparatus 110, The image forming apparatus 110 transmits a login request to the CPS 160 together with information for logging in to the CPS 160 inputted by the operation of the user (S807). The CPS 160 permits login based on the information received from the image forming apparatus 110 (S808). Thereafter, the image forming apparatus 110 selects a print job to be executed by a user's operation (S809). Here, it is assumed that the print job transmitted from the CPS 170 to the CPS 160 is selected.

Subsequently, the image forming apparatus 110 transmits an acquisition request of the selected print job to the CPS 160 (S810). The CPS 160 transmits the print job to the image forming apparatus 110 in response to the acquisition request (S811). Upon receiving the print job, the image forming apparatus 110 executes the print job to perform printing (S812). Thereafter, a series of processes illustrated in the sequence diagram of FIG. 8 is completed.

Figure 9:
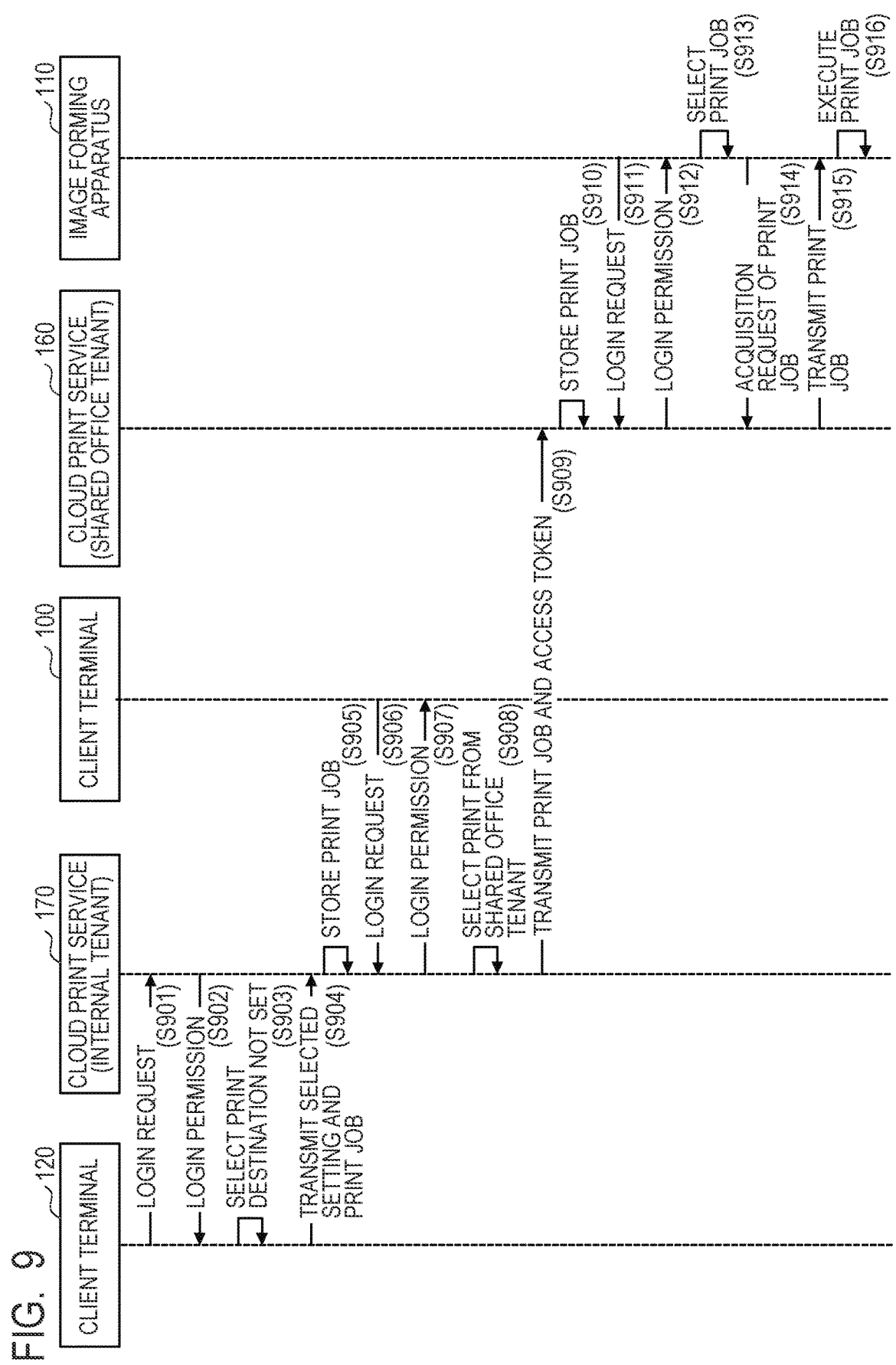
FIG. 9 illustrates a sequence diagram of a transmission flow of a print job.

In the sequence diagram illustrated in FIG. 8, in S803, a tenant for executing printing is designated when inputting the print job. However, when inputting the print job, it is not necessary to specify a tenant to perform printing. FIG. 9 is a sequence diagram illustrating the flow of processing until the image forming apparatus 110 executes a print job for printing data such as a document file stored in the client terminal 120 after specifying that the tenant to which the print job is executed is selected later.

The processes in S901 to S903 are the same as those in S801 to S803 of FIG. 8, and therefore the description thereof is omitted. However, in S903 of FIG. 9, a selection screen is displayed in which it is possible to specify that the tenant of the print job execution destination is to be selected later.

Figure 11:
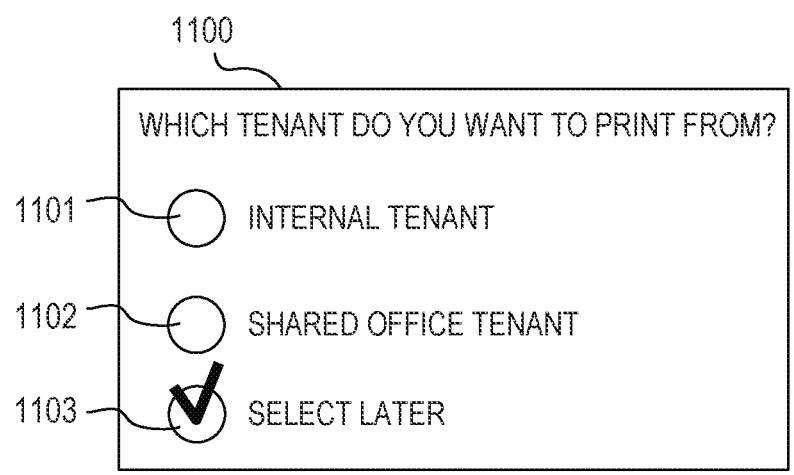
FIG. 11 illustrates an example of a selection screen.

FIG. 11 is a diagram illustrating an example of a print job execution destination selection screen displayed in S903 of FIG. 9. This selection screen is displayed on the display of the client terminal 120, The selection screen 1100 of FIG. 11 is provided with a check box 1101 for selecting the internal tenant, a check box 1102 for selecting the shared office tenant, and a check box 1103 for selecting a tenant later. In the following description, it is assumed that the check box 1103 is checked on the selection screen 1100 and the tenant is selected later.

When the setting for later selecting the tenant of the execution destination of the print job is set, the client terminal 120 transmits the print job to the CPS 170 together with the selected selling (S904).

Subsequently, the CPS 170 stores the print job received from the client terminal 120 in the HDD 204 or the like (S905).

For example, the user in a company performs an operation of transmitting a print job by the client terminal 120, and moves to the shared office and operates the client terminal 100 installed in the shared office. The client terminal 100 transmits a login request to the CPS 170 together with information for logging in the CPS 170 inputted by the operation of the user (S906). Thereafter, the CPS 170 permits the client terminal 100 to log in using the information received from the client terminal 100 (S907).

Next, the CPS 170 generates the selection screen for selecting the execution destination of the print job in response to the print request from the client terminal 100, and provides the selection screen to the client terminal 100. The client terminal 100 displays the provided selection screen and sets the execution destination tenant of the print job by the operation of the user (S908). In the following description, it is assumed that the check box 1102 is checked on the selection screen 1100 illustrating in FIG. 11 and the shared office tenant is selected.

When the shared office tenant is selected as the execution destination of the print job, the CPS 170 transmits the print job held in S905 to the CPS 160 together with the access token stored in S406 of FIG. 4 (S909). The CPS 160 stores the print job received from the CPS 170 in the HDD 204 or the like (S910). Subsequently, the user in the shared office moves in front of the image forming apparatus 110. The processes in S911 to S916 are the same as those in S807 to S812 of FIG. 8, and therefore the description thereof is omitted. Thereafter, a series of processes illustrated in the sequence diagram of FIG. 9 is completed.

According to the flowcharts of FIGS. 8 and 9 as described above, the image forming apparatus 110 can execute a print job for printing data such as a document file stored in the client terminal 120. In this case, by using the authorization information issued from the authorization server and pre-stored in the CPS 170, the print job can be quickly transmitted from the CPS 170 to the CPS 160 without periodically polling from the CPS 160. That is, it is possible to exchange information between the printing systems securely and smoothly.

[Deletion Flow of Authorization Information]

Figure 10:
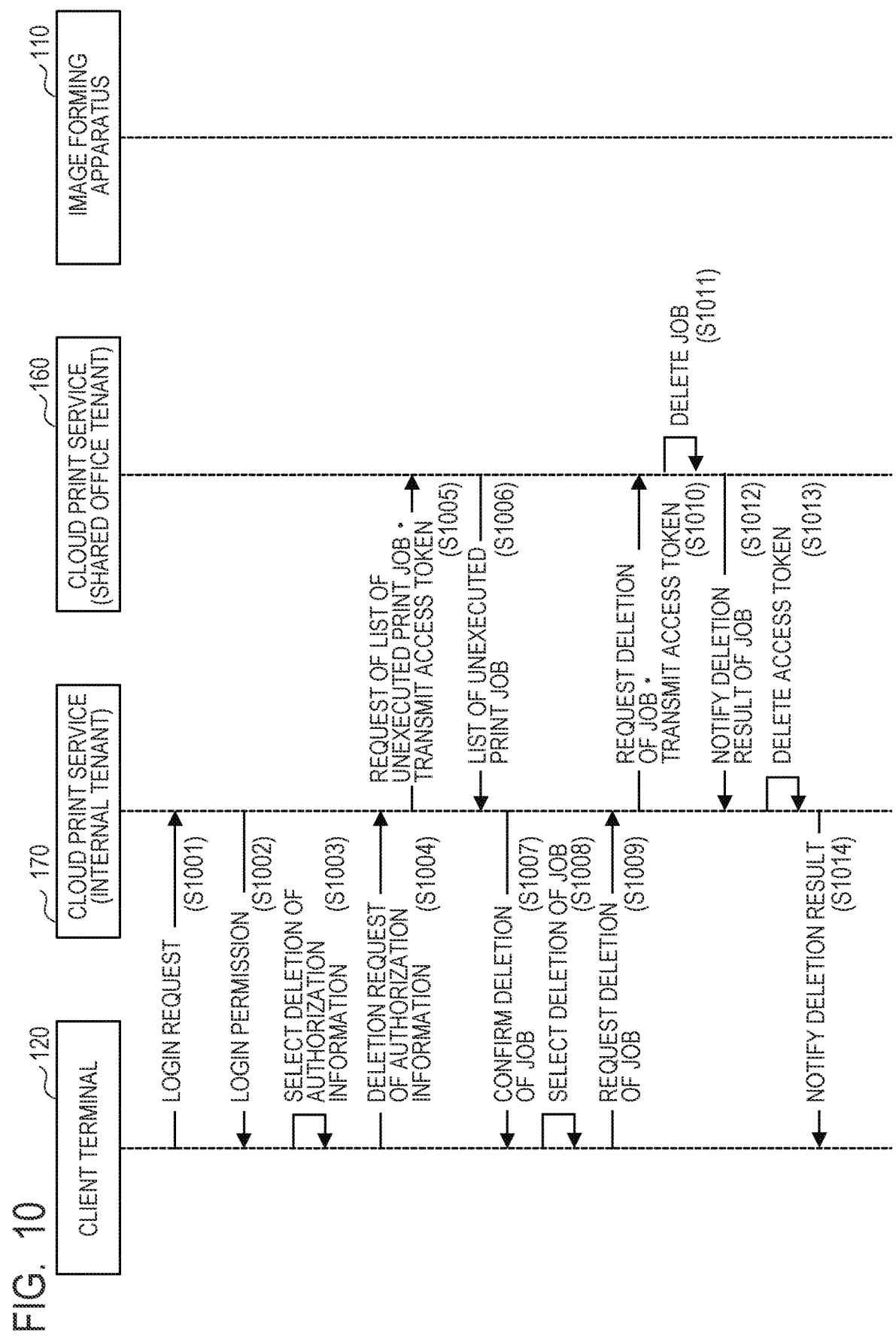
FIG. 10 illustrates a sequence diagram of the deleting flow of authorization information.

FIG. 10 is a sequence diagram illustrating a flow of processing for deleting the authorization information stored in the CPS 170.

First, the client terminal 120 transmits a login request to the CPS 170 together with information for logging in to the CPS 170 inputted by the operation of the user (S1001). Thereafter, the CPS 170 permits the client terminal 120 to log in based on the information received from the client terminal 120 (S1002). Next, in response to a request from the client terminal 120, the CPS 170 generates a screen for selecting disconnection with the connected tenant and provides the screen to the client terminal 120. The client terminal 120 displays the provided screen and receives an instruction of disconnection with the connected tenant by user operation (S1003).

Figure 12:
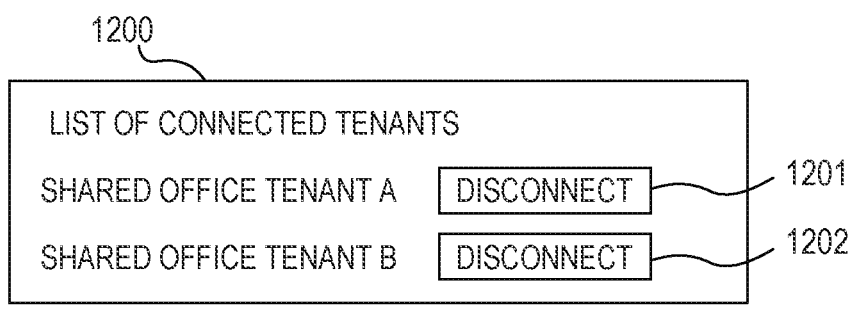
FIG. 12 illustrates an example of a screen for selecting disconnection.

FIG. 12 is a view illustrating an example of a screen for selecting disconnection with a connected tenant. This screen is displayed on the display of the client terminal 120. In the screen 1200 of FIG. 12, connection release buttons 1201 and 1202 are provided in association with the tenant names of the connected tenants. In the description of this embodiment, only one shared office tenant can be connected to the CPS 170, but a plurality of shared office tenants can be connected. By completing the authorization for each of the plurality of connectable shared office tenants, the plurality of shared office tenants are connected. In such a case, a plurality of connected tenants are listed, such as the shared office tenants A and B illustrated in FIG. 12. Hereinafter, it will be described that the disconnection button 1201 of the CPS 160 corresponding to the shared office tenant A is depressed on the screen 1200.

When the disconnection is instructed, the client terminal 120 transmits an authorization information deletion request to the CPS 170 (S1004).

Subsequently, the CPS 170 transmits a request of a list of unexecuted print jobs to the CPS 160 together with the access token stored in S406 of FIG. 4 (S1005). The CPS 160 transmits, to the CPS 170, a list of unexecuted print jobs among the print jobs received from the CPS 170 (S1006).

Subsequently, when there is an unexecuted print job, the CPS 170 generates a screen for selecting job deletion and provides it to the client terminal 120 (S1007). The client terminal 120 displays the provided screen and receives an instruction of job deletion by user operation (S1008). On the other hand, if there is no unexecuted print job, the process from S1007 is skipped and the process proceeds to S1013. Hereinafter, it is assumed that there is an unexecuted print job.

Figure 13:
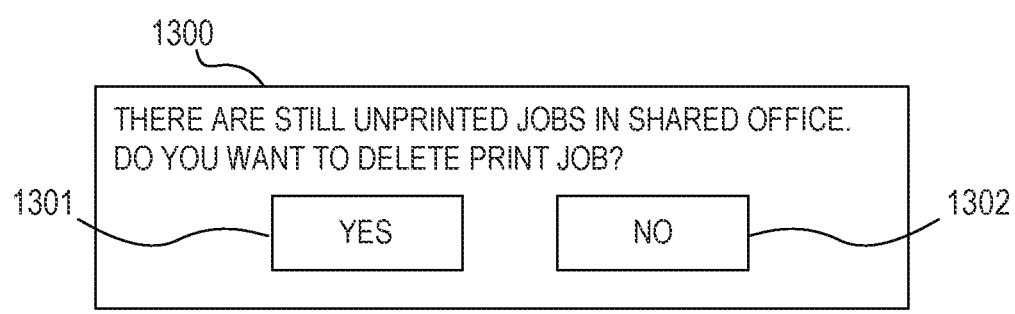
FIG. 13 illustrates an example of a screen for selecting job deletion.

FIG. 13 is a view illustrating an example of a screen for selecting job deletion. This screen is displayed on the display of the client terminal 120. The screen 1300 of FIG. 13 is provided with a display area for a message indicating that an unexecuted print job remains in the shared office tenant, "Yes" button 1301 for permitting the deletion of the print job, and "No" button 1302 for canceling the deletion. Hereinafter, it will be described that the "Yes" button 1301 is pressed on the screen 1300.

When the deletion of the job is instructed, the client terminal 120 transmits a deletion request of the job to the CPS 170 (S1009).

Subsequently, the CPS 170 transmits the deletion request of the unexecuted job to the CPS 160 together with the access token stored in S406 of FIG. 4 (S1010). In response to the deletion request received from the CPS 170, the CPS 160 deletes the unexecuted job (S1011) and then transmits the deletion result of the job to the CPS 170 (S1012).

Thereafter, the CPS 170 deletes the access token stored in S406 of FIG. 4 (S1013), and transmits the deletion result to the client terminal 120 (S1014).

According to the sequence of FIG. 10 as described above, the stored authorization information can be deleted and the connection between the tenants can be canceled. In addition, by deleting the unexecuted job when the authorization information is deleted, it is possible to prevent the job from remaining in the tenant even when the connection is disconnected.

Here, when the print job transmitted from the CPS 170 to the CPS 160 is executed by the image forming apparatus 110 in the shared office, there is a request that the execution result of the print job be managed by the CPS 170. For this purpose, it is necessary to transmit the job execution result from the CPS 160 to the CPS 170 after the print job transmitted from the CPS 170 to the CPS 160 is executed by the image forming apparatus 110. However, in order to transmit job execution results in a secure manner, the user needs to perform an authorization procedure that allows access from the CPS 160 to the CPS 170. That is, the user has to perform two authorization procedures for transmitting two pieces of data, i.e., the print job and the job execution result, which is troublesome.

As a method of transmitting the job execution result from the CPS 160 to the CPS 170, for example, there is a method of transmitting the print job from the CPS 170 to the CPS 160 and continuing a session until printing is executed by the image forming apparatus 110 in the shared office. For example, the CPS 170 may periodically poll the CPS 160 until printing is performed. However, these methods are not practical because it is not known when printing will be performed. A method for addressing these issues will be described with reference to FIG. 5.

[Acquiring Flow of the Result for Executing the Print Job]

Figure 5:
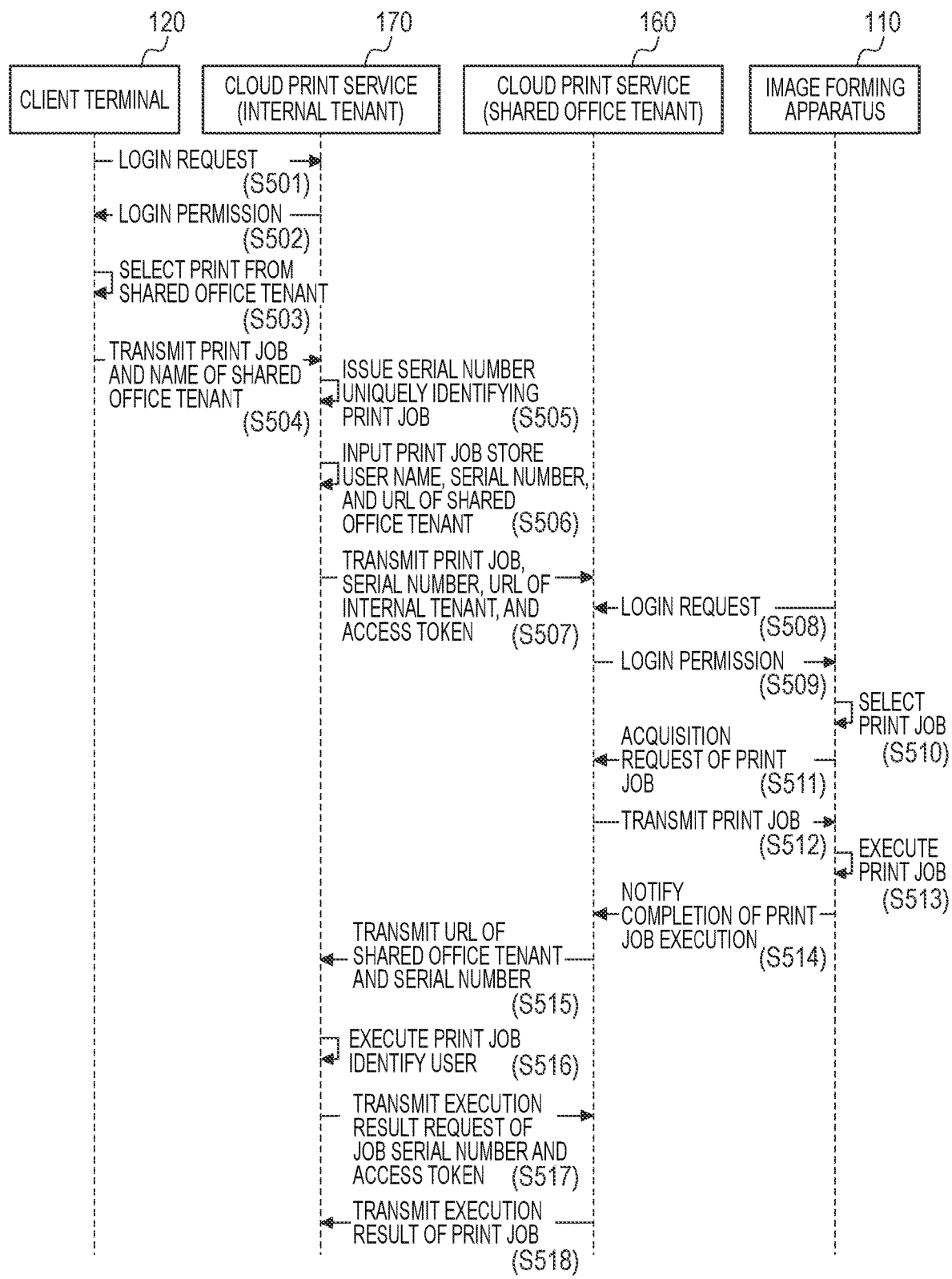
FIG. 5 illustrates a sequence diagram of an obtaining flow of job execution results.

FIG. 5 is a sequence diagram illustrating the flow of processing that the image forming apparatus 110 executes the print job for printing data such as a document file stored in the client terminal 120 and the CPS 170 acquires the print job execution result. It is assumed that the authorization has been completed according to the authorization sequence illustrated in FIG. 4, and the CPS 170 can transmit the print job to the CPS 160.

First, the client terminal 120 transmits the login request to the CPS 170 together with information for logging in to the CPS 170 inputted by the operation of the user (S501). Thereafter, the CPS 170 permits the client terminal 120 to log in based on the information received from the client terminal 120 (S502). Next, the CPS 170 generates the selection screen for selecting the execution destination of the print job in response to the print request from the client terminal 120, and provides the selection screen to the client terminal 120. The client terminal 120 displays the provided selection screen and selects the tenant to which the print job is executed by the user's operation (S503). Hereinafter, the description will be made assuming that the check box 702 is checked on the selection screen 700 and the shared office tenant is selected. The client terminal 120 further accepts the selection of the print job by the user and transmits the selected print job and tenant information to the CPS 170 (S504).

Next, the CPS 170 identifies the user information of the user who has input the print job (the user who has been permitted login in S502) and issues a serial number for uniquely identifying the print job (S505). Subsequently, the CPS 170 generates history information in which the identified user information, the serial number, and the URL of the tenant selected as the execution destination of the print job (in this embodiment, the URL of the CPS 160) are associated to store the history information in the RAM 203 or the like (S506). In this embodiment, each time the CPS 160 receives a print job, the CPS 160 generates the history information as described above and adds the history information to the job management list stored in the RAM 203 or the like. The URL of the CPS 160 is stored in S402 of FIG. 4.

Table 1 is an example of the job management list. In the first row of the Table 1, it is understood that the user name (user information) "User01" has transmitted the print job having the print job number (serial number) "000001" to the destination URL (URL of the selected tenant) "https://tenantA.com". By using the job management list to store the transmission history of the print job, it is possible to identify which user of the CPS 170 has sent which print job to which tenant. In the description of the present embodiment, although the CPS 170 can transmit the print job to only one shared office tenant, there may be a plurality of shared office tenants that can transmit the print job. In such a case, as shown in Table 1, a plurality of destination URLs exist. The print job number is an example of identification information of the print job.

TABLE 1

| User name | Print job number | Print job destination URL |
|---|---|---|
| User01 | 000001 | https://tenantA.com |
| User01 | 000002 | https://tenantB.com |
| User02 | 000003 | https://tenantA.com |

Subsequently, the CPS 170 transmits the print job, the serial number, and the URL of the CPS 170 received from the client terminal 120 to the CPS 160 together with the access token stored in S406 of FIG. 4 (S507). The CPS 160 stores the print job, the serial number, and the URL of the CPS 170 received from the CPS 170 in the HDD 204 or the like in association with each other. When the user in the shared office performs an operation for transmitting the print job by the client terminal 120 of a remote connection destination via the client terminal 100, the user moves to the front of an image forming apparatus 110. The image forming apparatus 110 transmits the login request to the CPS 160 together with information for logging in to the CPS 160 inputted by the operation of the user (S508). The CPS 160 permits login based on the information received from the image forming apparatus 110 (S509). Thereafter, the image forming apparatus 110 selects the print job to be executed by a user's operation (S510). Here, it is assumed that the print job transmitted from the CPS 170 to the CPS 160 is selected.

Subsequently, the image forming apparatus 110 transmits an acquisition request of the selected print job to the CPS 160 (S511), and the CPS 160 transmits the print job to the image forming apparatus 110 in response to the acquisition request (S512). Upon receiving the print job, the image forming apparatus 110 executes the print job to perform printing (S513). When the print job execution is completed, the image forming apparatus 110 notifies the CPS 160 of the completion of the print job execution (S514).

Upon receiving the notification of the completion of print job execution, the CPS 160 identifies the serial number and the URL of the CPS 170 stored in association with the executed print job to transmit the serial number and the URL of the CPS 160 to the URL of the CPS 170 (S515).

The CPS 170 receives the serial number and the URL of the CPS 160. Thus, the CPS 170 can recognize which print job is executed by which tenant. The CPS 170 identifies the user who has executed the print job based on the received serial number and the URL of the CPS 160 (S516). The user identification method will be described later with reference to FIG. 6. If the CPS 170 cannot identify the user in S516, the process illustrated in the sequence diagram of FIG. 5 ends.

Next, the CPS 170 transmits the print job execution result request including the received serial number to the CPS 160 together with the access token stored in association with the user identified in S516 (S517). The CPS 160 receives the print job execution result request from the CPS 170. The CPS 160 transmits the print job execution result corresponding to the serial number included in the print job execution result request to the CPS 170 (S518). When receiving the print job execution result from the CPS 160, the CPS 170 stores the received print job execution result in the HDD 204 or the like in association with the serial number of the print job and the tenant name of the execution destination of the print job. In addition to these, the user information of the user identified in S516 may be stored in association with each other. Thereafter, a series of processes illustrated in the sequence diagram of FIG. 5 is completed.

Table 2 shows an example of the print job execution results. As shown in Table 2, the print job execution result includes information such as the number of prints, printing method, and charging information.

TABLE 2

| Number of prints | Printing method | Charging amount |
|---|---|---|
| 3 | Color | 30 |

According to the sequence of FIG. 5 as described above, it is possible to transmit and receive the print job and the print job execution results from the CPS 170. Therefore, the print job and the print job execution result can be transmitted and received in a secure manner without performing an authorization process from the CPS 160 to the CPS 170. Further, the print job execution results performed by the image forming apparatus 110 in the shared office can be collectively managed by the CPS 170 (internal tenant) together with the print job execution results performed by the image forming apparatus 130 in the company. This makes it possible to charge for printing costs and review logs of documents printed by the user. Furthermore, since the authorization information does not need to be stored in the CPS 160 (the shared office tenant), which is a public environment, the security can be enhanced.

[Identifying Processing of the User Executing the Print Job]

Next, with reference to FIG. 6, a detailed description will be given of the process of identifying the user executing the print job in S516 of FIG. 5.

First, in S601, the CPS 170 acquires the URL of the external CPS and the serial number of the print job executed based on the information received in S515 of FIG. 5. For example, it is assumed that the URL is "https://tenantA-.com" and the serial number is "0000001".

Next, in S602, the CPS 170 determines whether there is history information having the serial number acquired in S601 in the job management list as shown in Table 1. When the CPS 170 determines that there is history information, the CPU identifies the history information and proceeds to S603. When the CPS 170 determines that there is no history information, the flow chart illustrated in FIG. 6 ends.

In S603, the CPS 170 determines whether the transmission destination URL of the history information identified in S602 matches the URL acquired in S601. If the CPS 170 determines that the transmission destination URL matches the acquired URL, the process proceeds to S604. If CPS 170 determines that the transmission destination URL does not match the acquired URL, the flow chart illustrated in FIG. 6 ends. That is, the CPS 170 confirms whether or not the print job of the serial number received in S515 has been transmitted to the external CPS having the URL received in S515. In the example, since it can be confirmed that the print job of "0000001" has been transmitted to "https://tenantA.com" based on the first line of Table 1, the process proceeds to S604.

In S604, the CPS 170 identifies the user information included in the history information identified in S602 as the user executing the print job, in the example, the user name "User01" can be identified based on Table 1.

Figure 6:
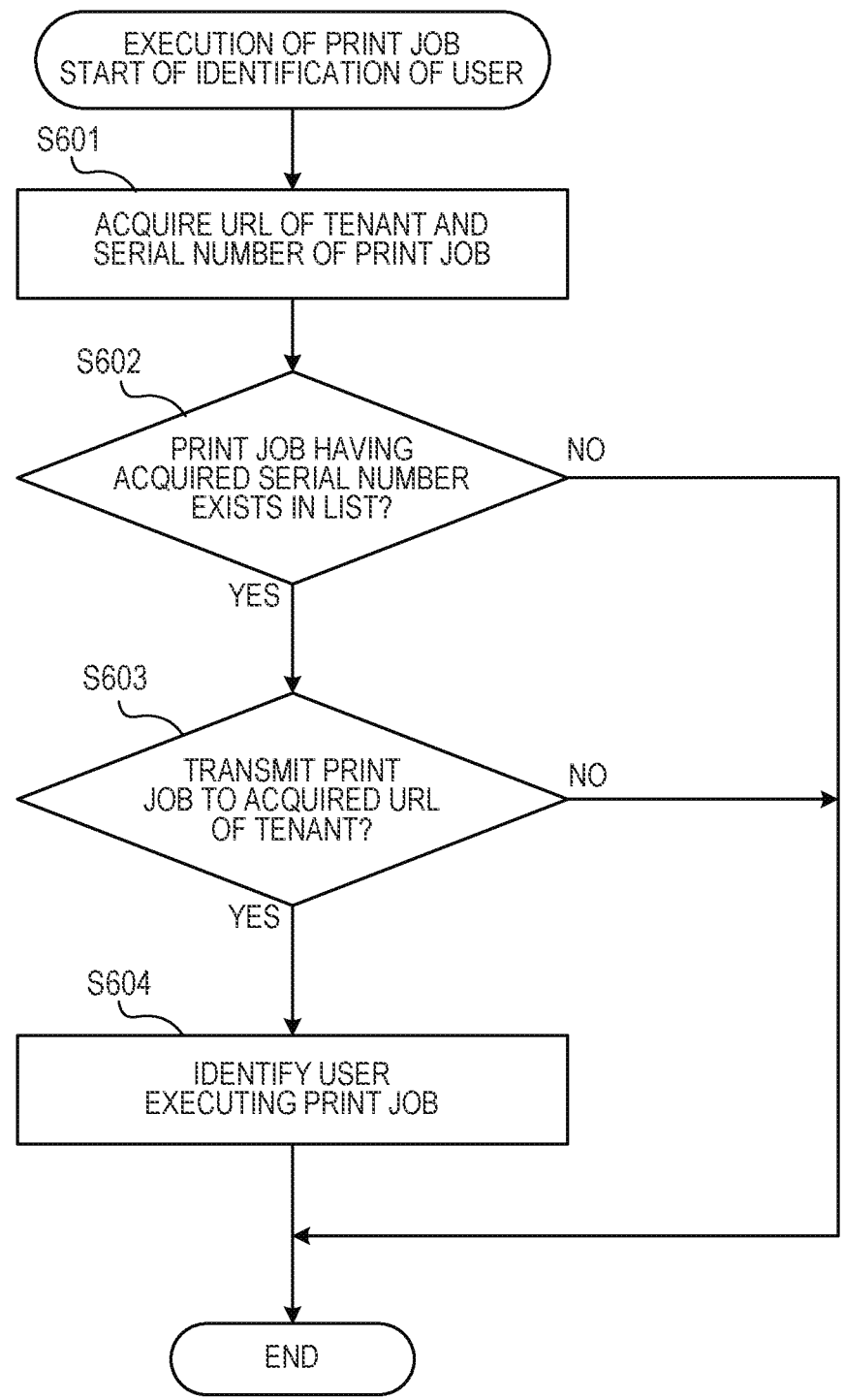
FIG. 6 illustrates a flowchart of the details of identification process of the user executing the print job.

According to the flow chart of FIG. 6 as described above, it is possible to identify which user of the CPS 170 has executed the print job in the image forming apparatus 110 connected to the CPS 160.

According to the system of this embodiment, when a print job is executed by the image forming apparatus connected to a CPS (second service) different from the CPS (first service) to which the client terminal is connected, the print job execution result can be acquired by the first service side in one authorization procedure. Thus, it is possible to reduce the labor of the user involved in the approval processing.

According to embodiments of the present disclosure, it is possible to securely and smoothly exchange information between different printing systems.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-062990, filed Apr. 1, 2021, and Japanese Patent Application No. 2021-164774, filed Oct. 6, 2021, both of which are hereby incorporated by reference herein in their entirety.

What is claimed is:

1. A system including a first printing system and a second printing system, the first printing system being communicable with a client terminal and an authorization system and the second printing system being communicable with an image forming apparatus, wherein the first printing system comprises one or more first memories and one or more first processors that execute a set of first instructions to:
perform, to the authorization system, an acquisition request of authorization information to the second printing system;
receive, from the authorization system, the authorization information to the second printing system;
store the received authorization information in the one or more first memories;
receive print job from the client terminal;
transmit, to the second printing system, the print job received from the client terminal and identification information of the print job by using the stored authorization information;
transmit an acquisition request of an execution result of the print job to the second printing system by using the stored authorization information in a case where the identification information is received from the second printing system; and
receive, from the second printing system, the execution result of the print job, and wherein the second printing system comprises one or more second memories and one or more second processors that execute a set of second instructions to:
receive the print job and the identification information transmitted from the first printing system;
store the received identification information of the print job in the one or more second memories;
transmit the received print job to the image forming apparatus;
transmit the identification information to the first printing system in a case where the image forming apparatus executes the print job transmitted from the second printing system; and transmit the execution result of the print job to the first printing system in response to receiving the acquisition request transmitted from the first printing system.

2. The system according to claim 1, wherein the one or more first processors further execute the set of the first instructions to:
store the print job received from the client terminal in the one or more first memories,
wherein the stored print job is transmitted to the second printing system by using the stored authorization information in a case where the second printing system is selected as an execution destination of the stored print job.

3. The system according to claim 1, wherein the one or more first processors further execute the set of the first instructions to:
store the identification information of the print job and user information of a user who inputs the print job in the one or more first memories in association with each other; and
identify, in a case where the identification information is received from the second printing system, the user information associated with the received identification information,
wherein the acquisition request of the execution result of the print job is transmitted to the second printing system by using the stored authorization information corresponding to the identified user information.

4. The system according to claim 1, wherein the authorization information is an access token issued by the authorization system based on an authorization of access to the second printing system in response to user authentication.

5. A system including a first printing system and a second printing system, the first printing system being communicable with a client terminal and an authorization system and the second printing system being communicable with an image forming apparatus,
wherein the first printing system comprises one or more first memories and one or more first processors that execute a set of first instructions to:
perform, to the authorization system, an acquisition request of authorization information to the second printing system;
receive, from the authorization system, the authorization information to the second printing system;
store the received authorization information in the one or more first memories;
receive print job from the client terminal; and
transmit, to the second printing system, the print job received from the client terminal by using the stored authorization information, and
wherein the second printing system comprises one or more second memories and one or more second processors that execute a set of second instructions to:
receive the transmitted print job from the first printing system; and
transmit the print job received from the first printing system to the image forming apparatus,
wherein the one or more first processors further execute the set of the first instructions to:
transmit a deletion request of an unexecuted print job stored in the second printing system to the second printing system by using the stored authorization information in a case where the first printing system disconnects connection with the second printing system; and delete the stored authorization information in a case where a result of deleting the unexecuted print job is notified from the second printing system, and
wherein the one or more second processors further execute the set of the second instructions to:
delete the unexecuted print job in response to the deletion request.

6. A first printing system that is communicable with a client terminal and an authorization system, the first printing system comprising:
one or more memories; and
one or more processors that execute a set of instructions to:
perform, to the authorization system, an acquisition request of authorization information to a second printing system that is communicable with an image forming apparatus;
receive, from the authorization system, the authorization information to the other printing systems;
store the received authorization information in the one or more memories;
receive print job from the client terminal;
transmit the received print job and identification information of the print job to the second printing system by using the stored authorization information;
transmit an acquisition request of an execution result of the print job to the second printing system by using the stored authorization information in a case where the identification information is received from the second printing system; and
receive, from the second printing system, the execution result of the print job,
wherein the second print system receives the print job and the identification transmitted from the first printing system, transmits the received print job to the image forming apparatus, transmits the identification information to the first printing system in a case where the image forming apparatus executes the print job transmitted from the second printing system, and transmits the execution result of the print job to the first printing system in response to receiving the acquisition request transmitted from the first printing system.

7. A method for controlling a system including a first printing system and a second printing system, the first printing system being communicable with a client terminal and an authorization system and the second printing system being communicable with an image forming apparatus, the method comprising:
performing by the first printing system, to the authorization system, an acquisition request of authorization information to the second printing system;
receiving, by the first printing system, from the authorization system, the authorization information to the second printing system;
storing, by the first printing system, the received authorization information;
receiving, by the first printing system, print job from the client terminal;
transmit, by the first printing system, to the second printing system, the received print job and identification information of the print job by using the stored authorization information;
receiving, by the second printing system, the print job and the identification information transmitted from the first printing system;

storing, by the second printing system, the received identification information of the print job in one or more second memories of the second printing system;

transmitting, by the second printing system, the received print job to the image forming apparatus;

transmitting, by the second printing system, the identification information to the first printing system in a case where the image forming apparatus executes the print job transmitted from the second printing system;

transmitting, by the first printing system, an acquisition request of an execution result of the print job to the second printing system by using the stored authorization information in a case where the identification information is received from the second printing system;

transmitting, by the second printing system, the execution result of the print job to the first printing system in response to receiving the acquisition request transmitted from the first printing system; and receiving, by the first printing system, the execution result of the print job from the second printing system.

8. A method for controlling a printing system that is communicable with a client terminal and an authorization system, the method comprising:

performing, to the authorization system, an acquisition request of authorization information to a second printing system that is communicable with an image forming apparatus;

receiving, from the authorization system, the authorization information to the other printing systems;

storing the received authorization information;

receiving print job from the client terminal;

transmitting the received print job and identification information of the print job to the second printing system by using the stored authorization information;

transmitting an acquisition request of an execution result of the print job to the second printing system by using the stored authorization information in a case where the identification information is received from the second printing system; and receiving, from the second printing system, the execution result of the print job, wherein the second print system receives the print job and the identification transmitted from the first printing system, transmits the received print job to the image forming apparatus, transmits the identification information to the first printing system in a case where the image forming apparatus executes the print job transmitted from the second printing system, and transmits the execution result of the print job to the first printing system in response to receiving the acquisition request transmitted from the first printing system.

* * * * *